United States Patent Office 3,158,629
Patented Nov. 24, 1964

3,158,629
6α,16α-DIMETHYL-Δ⁴-PREGNEN-17α-OL-3,20-DIONE-17-ACYLATES
Carl Djerassi and Howard J. Ringold, Mexico City, Mexico, assignors, by mesne assignments, to Syntex Corporation, a corporation of Panama
No Drawing. Filed Nov. 14, 1958, Ser. No. 773,818
Claims priority, application Mexico, June 27, 1958
9 Claims. (Cl. 260—397.4)

The present invention relates to novel cyclopentanophenanthrene compounds.

More particularly the present invention relates to novel 6α-methyl-16α-lower alkyl derivatives of 17α-acyloxy-1-dehydro-progesterone wherein the acyloxy group is derived from a hydrocarbon carboxylic acid of less than 12 carbon atoms. These compounds and especially the 16-methyl derivatives, are potent progestational hormones when administered either orally or by injection.

The following formula illustrates the novel final compounds and progestational hormones of the present invention:

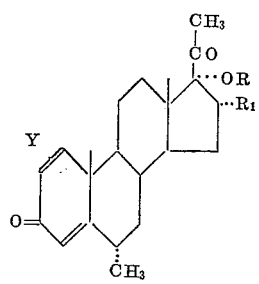

In the above formula Y indicates a double bond between C–1 and C–2 or a saturated linkage and R represents a hydrocarbon carboxylic ester group of less than 12 carbon atoms, straight chain or branched chain aliphatic, cyclic, cyclo-aliphatic, aromatic, and which may be substituted such as with halogen or methoxy. Typical examples of such ester groups are the acetate, propionate, enanthate, hemisuccinate, trimethylacetate, benzoate, cyclopentylpropionate, phenoxyacetate and β-chloropropionate. $R_1$ represents a lower alkyl group such as methyl or ethyl.

The following equation illustrates a process for the preparation of the novel compounds of the present invention:

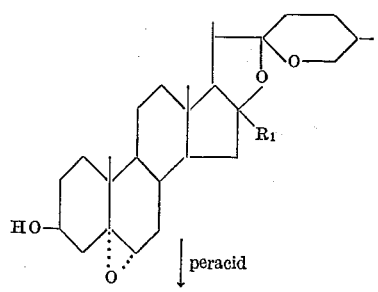

↓ peracid

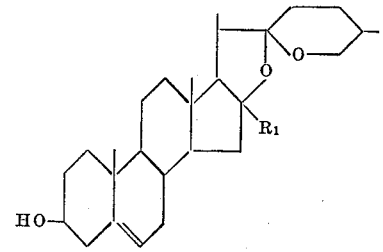

↓ methyl magnesium bromide

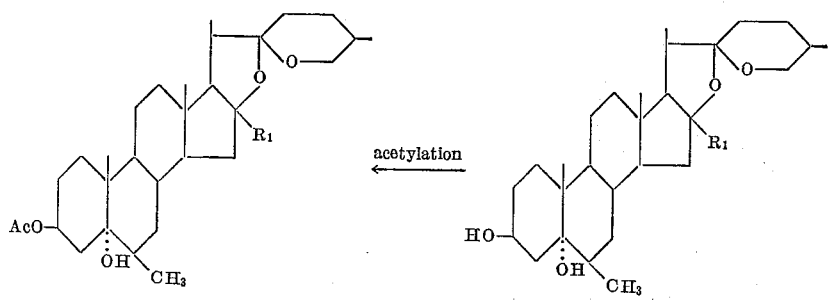

↓ thionyl chloride

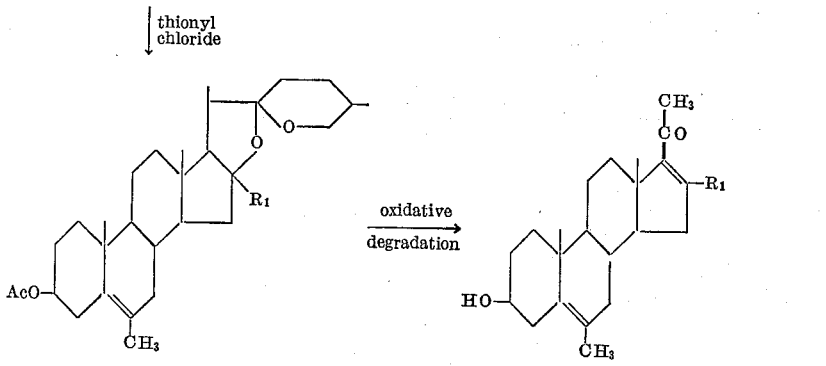

↓ epoxidation

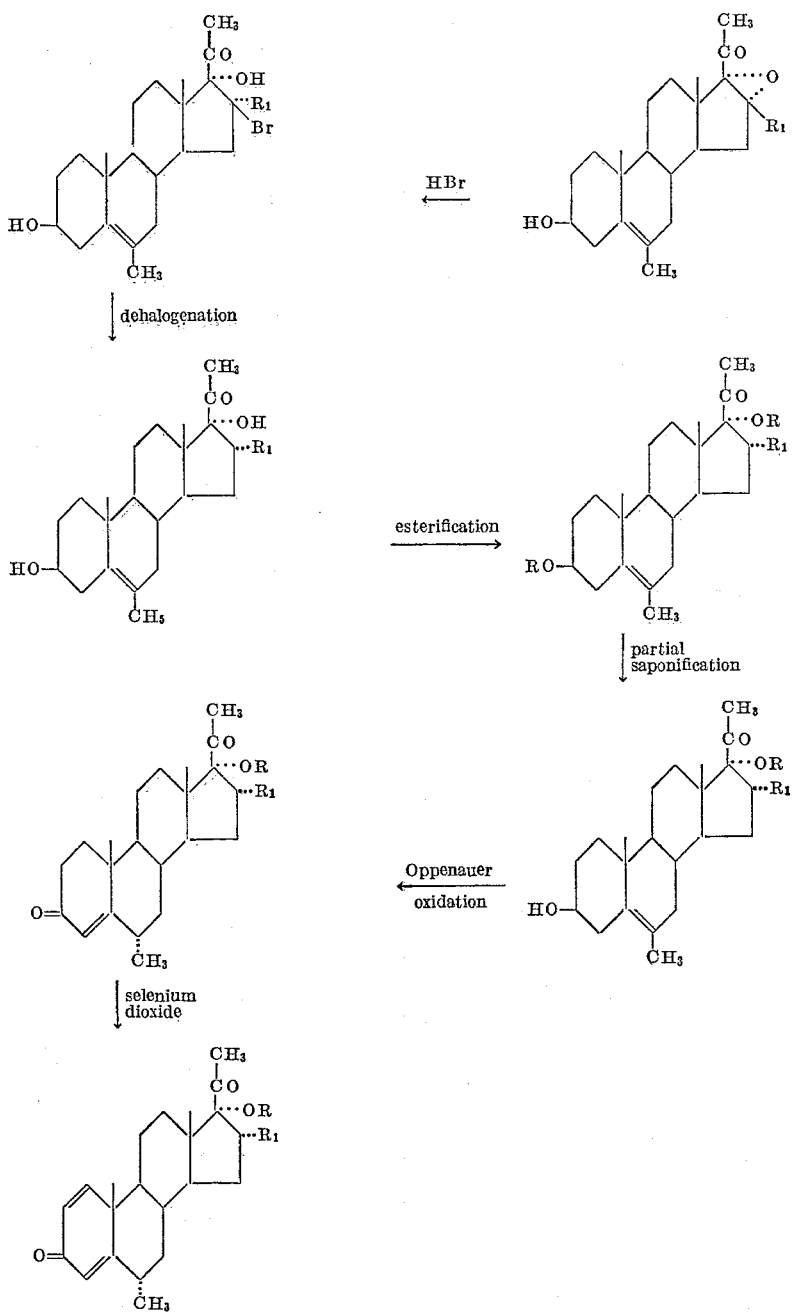

In the above equation R and $R_1$ represents the same groups as heretofore set forth.

In practicing the process outlined the starting materials are the 16α-lower-alkyl derivatives of diosgenin (J.A.C.S., 71 (1949)). The perferable starting material is the 16-methyl compound. These starting materials were epoxidized by reaction with a peracid, preferably an aromatic acid, such as perbenzoic acid to form the corresponding 5α,6α-oxido derivatives. These last compounds were then treated with methyl magnesium bromide to form the corresponding 6β-methyl-16-lower alkyl-22a,25D-spirostan-3β,5α-diol. The hydroxy group of these last compounds was then selectively acetylated at C–3 with acetic anhydride and the resulting diol monoacetates were then dehydrated by reaction with thionyl chloride in pyridine, thereby producing the acetates of 6-methyl-16-lower alkyl-diosgenin. By conventional oxidative degradation, the side chain was degraded and the resultant compounds were the 6-methyl-16-lower alkyl-$\Delta^{5,16}$-pregnadien-3β-ol-20-ones.

The double bond between C—16 and C—17 of these compounds were then epoxidized, preferably with hydrogen peroxide in alkaline aqueous methanol, to form the corresponding 16α,17α-oxido compounds and the epoxide ring of these compounds was then opened by reaction with hydrogen bromide. The resultant compounds were the 6-methyl-16α-lower alkyl-16β-bromo-$\Delta^5$-pregnen-3β, 17α-diol-20-ones. These compounds upon treatment, with Raney nickel were dehalogenated to give the corresponding 6-methyl-16α-lower alkyl-$\Delta^5$-pregnen-3β,17α-diol-20-one derivatives. Treatment of these compounds under conditions known for the introduction of a 17α-ester group, i.e. as by treatment with an excess of anhydride of a hydrocarbon carboxylic acid preferably in the presence of an acid catalyst, gave the corresponding diesters of hydrocarbon carboxylic acids of less than 12 carbon atoms. The ester group at C–3 of the diesters thus formed were then selectively hydrolyzed by a mild alkaline treatment to give the corresponding 6-methyl-16α-lower alkyl-17α-acyloxy-Δ⁵-pregnen-3β-ol-20-one derivative and treatment of these compounds by the Oppenhauer method gave the corresponding 6α-methyl-16α-lower alkyl-17α-acyloxy-Δ⁴-pregnen-3,20-dione compound. For the introduction of an additional bond between C–1 and C–2 of these compounds, they were treated by known methods with selenium dioxide or by microbiological methods as, for example incubation with Corynebacterium simplex.

The following specific examples serve to illustrate, but are not intended to limit the present invention.

*Example 1*

100 g. of 16-methyl-diosgenin in 2 lt. of chloroform was treated with 1.1 molar equivalents of perbenzoic acid in chloroform solution at room temperature, in the dark, for a period of 24 hours; the solution was washed with 5% sodium carbonate solution and water, dried over anhydrous sodium sulfate and evaporated to dryness. The residue was purified by chromatography on washed alumina to give 16-methyl-5α,6α-oxido-22a,25D-spirostan-3β-ol.

50 g. of the above compound was dissolved in 1 lt. of thiophene free anhydrous benzene, mixed with 250 cc. of a 3 N ether solution of methyl magnesium bromide and refluxed for 6 hours. The cooled mixture was poured into 5 lt. of a cold solution of 200 g. of ammonium chloride in water; the organic layer was separated, the aqueous phase was extracted with ethyl acetate and the combined benzene layer and extract was washed with saturated aqueous sodium chloride solution, dried over anhydrous sodium sulfate and evaporated to dryness. The residue was purified by chromatography on neutral alumina, thus yielding 6β,16-dimethyl-22a,25D-spirostan-3β,5α-diol.

The treatment of a solution of the above compound in 200 cc. of pyridine with 50 cc. of acetic anhydride at room temperature overnight, followed by dilution with water, short heating on the steam bath, cooling and filtration of the precipitate furnished the 3-acetate of 6β,16-dimethyl-22a,25D-spirostan-3β,5α-diol, which was purified by recrystallization from acetone-hexane.

40 g. of 6β,16-dimethyl-22a,25D-spirostan-3β,5α-diol acetate was dissolved in 300 cc. of pyridine, cooled to 0° C. and treated with 20 cc. of thionyl chloride. The mixture was kept for 15 minutes at 0° C., then poured into ice water and the reaction product was extracted with ether. The extract was washed with dilute hydrochloric acid and water, dried over anhydrous sodium sulfate and evaporated to dryness. The residue crystallized from acetone-hexane to yield 6,16-dimethyl-diosgenin acetate.

A mixture of 30 g. of 6,16-dimethyl-diosgenin acetate and 120 cc. of acetic anhydride was heated in a sealed tube at temperatures around 190° C. for 8 hours, cooled and poured into ice water, the reaction product was extracted with ether, washed with 5% sodium carbonate solution, dried over anhydrous sodium sulfate and evaporated to dryness. Recrystallization of the residue from acetone-hexane afforded 6,16-dimethyl-pseudo-diosgenin diacetate.

20 g. of the above compound was dissolved in a mixture of 350 cc. of acetic acid, 200 cc. of methylene dichloride and 100 cc. of water, with slight heating. The solution was cooled to 15° C. and treated dropwise under stirring with a solution of 10 g. of chromium trioxide in 200 cc. of 90% acetic acid. The mixture was allowed to react for 2 hours at room temperature and then poured into water. The methylene dichloride layer was separated by decantation, the aqueous phase was extracted with chloroform and the combined methylene dichloride and chloroform solution was washed with water, dried over anhydrous sodium sulfate and evaporated to dryness. The residue crystallized from acetone-hexane to give the 16-(γ-methyl-δ-acetoxy)-valerate of 16-methyl-3β-acetoxy-Δ⁵-pregnen-16-ol-20-one.

15 g. of the above diosone was refluxed for 1 hour with a mixture of 10 g. of potassium hydroxide, 200 cc. of acetone and 100 cc. of water. The mixture was acidified with acetic acid, concentrated to a small volume and poured into water; the precipitate was collected, washed with water, air dried and recrystallized from acetone-hexane. There was thus obtained 6,16-dimethyl-Δ⁵,¹⁶-pregnadien-3β-ol-20-one.

10 g. of 6,16-dimethyl-Δ⁵,¹⁶-pregnadien-3β-ol-20-one was dissolved in 700 cc. of methanol, cooled to 15° C. and treated under stirring with 20 cc. of 4 N aqueous sodium hydroxide solution followed by 40 cc. of 30% aqueous hydrogen peroxide solution, while the temperature of the mixture was maintained below 15° C. The mixture was kept standing overnight in the refrigerator and then poured into 2,750 cc. of ice water; the precipitate was collected by filtration, washed with water, and dried, thus giving the crude 6,16 dimethyl-16α,17α-oxido-Δ⁵-pregnen-3β-ol-20-one, which was used for the next step without further purification. The analytical sample was obtained by recrystallization from methanol.

10 g. of the above crude compound was suspended in 100 cc. of methylene dichloride, cooled to 10° C. and slowly mixed under stirring with 10 cc. of a saturated solution of dry hydrogen bromide in acetic acid, while the temperature of the mixture was maintained below 15° C. The stirring was continued at room temperature for half an hour and the mixture was diluted with ice water; the organic phase was separated, washed with water, dried over anhydrous sodium sulfate and the methylene chloride was removed by distillation under reduced pressure. The residue was used as such for the next stage, without further purification. In another experiment the residue was crystallized from acetone-hexane, to furnish the pure 6,16α-dimethyl-16β-bromo-Δ⁵-pregnen-3β,17α-diol-20-one.

5 g. of the above crude bromohydrin was added to a suspension of 10 g. of Raney nickel in 150 cc. of methanol and the mixture was refluxed for 4 hours under an atmosphere of nitrogen; the nickel was filtered under an atmosphere of nitrogen and the filtrate was concentrated until a bulky precipitate was obtained, which was filtered, washed with water and dried. Chromatography of the residue on silica gel afforded 6,16α-dimethyl-Δ⁵-pregnen-3β,17α-diol-20-one.

2 g. of 6,16α-dimethyl-Δ⁵-pregnen-3β,17α-diol-20-one was mixed with 20 cc. of acetic anhydride and 200 mg. of p-toluenesulfonic acid and kept for 24 hours at a temperature around 25° C.; the mixture was poured into ice water, heated for half an hour on the steam bath, cooled and the precipitate was filtered, thus giving the crude 6,16α-dimethyl-Δ⁵-pregnen-3β,17α-diol-20-one, 3,17-diacetate. In another experiment this compound was obtained in pure form by recrystallization from acetone-hexane.

The above crude compound was treated with 50 cc. of 1% potassium hydroxide solution at 0° C. under an atmosphere of nitrogen for 2 hours; after diluting with water the precipitate was collected, washed with water, dried and recrystallized from methanol. There was thus obtained 6,16α-dimethyl-Δ⁵-pregnen-3β,17α-diol-20-one 17-acetate.

1.5 g. of the above compound was mixed with 60 cc. of dry toluene and 12 cc. of cyclohexanone and traces of moisture were removed by distillation of about 8 cc. of the mixture; there was then added a solution of 3.3 g. of aluminum isopropylate in 12 cc. of anhydrous toluene and the mixture was refluxed for 3 hours. It was then diluted with 110 cc. of a solution of sodium potassium tartrate and the volatile solvents were removed by steam distillation. The residue was cooled and the solid precipitate was filtered, washed with water, dried and recrystallized from aqueous methanol, thus yielding 6α,16α-dimethyl-Δ⁴-pregnen-17α-ol-3,20-dione 17-acetate.

A mixture of 1 g. of 6α,16α-dimethyl-17α-acetoxy-progesterone, obtained as described above, 50 cc. of t-butanol, 0.4 g. of recently sublimed selenium dioxide and 0.2 cc. of pyridine was refluxed under an atmosphere of nitrogen for 48 hours, cooled, filtered through celite, washing the filter with a little hot t-butanol, and the combined filtrate and washings was evaporated to dryness under reduced pressure. The residue was refluxed in acetone solution with decolorizing charcoal for 1 hour, filtered through celite and the acetone was removed by distillation. Chromatography of the residue on neutral alumina yielded 6α,16α-dimethyl-$\Delta^{1,4}$-pregnadien-17α-ol-3,20-dione 17-acetate.

*Example II*

In the method of Example I, in the step of the preparation of the diester of 6,16-dimethyl-$\Delta^5$-pregnen-3β,17α-diol-20-one, there was substituted the acetic anhydride for propionic anhydride. There was thus obtained the dipropionate of this diolone, which was selectively hydrolyzed at the propionoxy group at C–3, by means of the aforementioned alkaline treatment, except that it was conducted for 6 hours. The Oppenauer oxidation then gave 6α,16α-dimethyl-17α-hydroxyprogesterone 17-propionate, and finally there was obtained 6α,16α-dimethyl-$\Delta^{1,4}$-pregnadien-17α-ol-3,20-dione 17-propionate.

*Example III*

When in the methods of the previous examples the acetic anhydride or propionic anhydride were substituted by another anhydride of a hydrocarbon carboxylic acid having up to 12 carbon atoms, there were obtained the corresponding diesters and 17-monoesters of 6,16-dimethyl-$\Delta^5$-pregnen-3β,17α-diol-20-one and then the corresponding 17-esters of 6α,16α-dimethyl-$\Delta^4$-pregnen-17α-ol-3,20-dione and of 6α,16α-dimethyl-$\Delta^{1,4}$-pregnadien-17α-ol-3,20-dione, respectively. Specifically there were thus prepared the cyclopentylpropionates, caproates and benzoates.

*Example IV*

In the methods of the previous examples there was substituted for the starting 16-methyl-diosgenin another 16-lower alkyl-diosgenin to obtain the intermediate and final compounds having the corresponding alkyl group at C–16. For example, starting from 16-ethyl-diosgenin there were prepared 6α-methyl-16α-ethyl-17α-acyloxy-progesterone and a 6α-methyl-16α-ethyl-17α-acyloxy-$\Delta^{1,4}$-pregnadien-3,20-dione, respectively wherein the acyloxy groups were the same as those previously specified.

We claim:
1. The propionate of 6α,16α-dimethyl-$\Delta^4$-pregnen-17α-ol-3,20-dione.
2. The caproate of 6α,16α-dimethyl-$\Delta^4$-pregnen-17α-ol-3,20-dione.
3. The cyclopentylpropionate of 6α,16α-dimethyl-$\Delta^4$-pregnen-17α-ol-3,20-dione.
4. The benzoate of 6α,16α-dimethyl-$\Delta^4$-pregnen-17α-ol-3,20-dione.
5. 6,16α-dimethyl-16β-bromo-$\Delta^5$-pregnen-3β,17α-diol-20-one.
6. 6,16α-dimethyl-$\Delta^5$-pregnen-3β,17α-diol-20-one.
7. The 3,17-diesters of hydrocarbon carboxylic acids of less than 12 carbon atoms of 6,16α-dimethyl-$\Delta^5$-pregnen-3β,17α-diol-20-one.
8. The 17-monoesters of hydrocarbon carboxylic acids of less than 12 carbon atoms of 6,16α-dimethyl-$\Delta^5$-pregnen-3β,17α-diol-20-one.
9. 6α,16α-dimethyl-17α-acyloxy-$\Delta^4$-pregnene-3,20-dione wherein the acyloxy group is that of a hydrocarbon carboxylic acid of 3 to less than 12 carbon atoms.

References Cited in the file of this patent
UNITED STATES PATENTS

| | | |
|---|---|---|
| 2,697,109 | Dodson | Dec. 14, 1954 |
| 2,805,230 | Stork et al. | Sept. 3, 1957 |
| 2,878,246 | Miramontes et al. | Mar. 17, 1959 |
| 2,878,247 | Miramontes et al. | Mar. 17, 1959 |
| 2,880,213 | Loken et al. | Mar. 31, 1959 |
| 2,888,457 | Beyler et al. | May 26, 1959 |